United States Patent [19]
Weihe

[11] Patent Number: 5,877,418
[45] Date of Patent: Mar. 2, 1999

[54] SOLAR POWERED TUBE ROTATOR

[76] Inventor: Clyde R. Weihe, 17 Lindberg Ave., Needham, Mass. 02194

[21] Appl. No.: 690,718

[22] Filed: Jul. 31, 1996

[51] Int. Cl.$^6$ ........................................................ A61B 5/22
[52] U.S. Cl. .................................... 73/379.02; 73/379.06; 136/291
[58] Field of Search ........................... 73/379.02, 379.06; 136/291

[56] References Cited

U.S. PATENT DOCUMENTS

| | | | |
|---|---|---|---|
| 4,374,406 | 2/1983 | Hepp | 362/253 |
| 4,596,083 | 6/1986 | Thompson | 40/473 |
| 4,873,790 | 10/1989 | Laterza | 47/67 |

*Primary Examiner*—Aaron Weisstuch
*Attorney, Agent, or Firm*—Wolf, Greenfield & Sacks, P.C.

[57] ABSTRACT

An apparatus for demonstrating the conversion of solar energy to mechanical energy, the apparatus comprising:
- a solar energy device which collects and converts solar energy to electrical energy;
- a motor connected to the solar energy device for receiving electrical energy therefrom, the motor having a rotatable shaft which is rotatably drivable by the received electrical energy;
- wherein the motor is fixedly connected to a portable platform having a pair of hand grip surfaces spaced a selected straight line distance apart from each other;
- wherein a tube or rod having a longitudinal axis is fixedly connected or interconnected at an end thereof to the drive shaft of the motor such that the tube or rod is rotatably drivable around its longitudinal axis; and
- wherein the tube or rod is fixedly connected or interconnected to the drive shaft of the motor such that the longitudinal axis of the tube or rod is oriented approximately perpendicular to the straight line distance between the hand grip surfaces of the platform.

17 Claims, 3 Drawing Sheets

SOLAR POWERED TUBE ROTATOR

FIELD OF THE INVENTION

The present invention relates to strength testing and demonstration devices, and more particularly to a solar powered rotating tube which can be used as an educational tool.

BACKGROUND OF THE INVENTION

Strength testing devices, toys and games such as weight throwing and lifting devices, hammer hitting apparatuses, gripping devices and the like have been used for many years. Such devices and apparatuses provide amusement and entertainment value for the user, but not an educational value to any significant degree. The vast majority of the public is unaware that the "amount of sunshine energy that hits the surface of the earth every minute is greater than the total amount of energy that the world's human population consumes in a year." (U.S. Department of Energy).

A portable device that demonstrates this energy and force to people of all ages and which is both simple to use and to understand would be ideal in promoting the public's general awareness of solar power. The device should allow for an instructor to hold or carry the device as he or she gives his demonstration and speech on solar power. Additionally, the students should be able to participate in the demonstration, so as to "experience" the magnitude of solar power.

SUMMARY OF THE INVENTION

In accordance with the invention, there is provided a portable solar powered tube rotator which includes a solar energy collector/converter electrically connected to a motor which has a drive shaft and a drive gear that engages a rotatable mounting shaft located on a mounting plate. A disc which has an inner and an outer diameter is axially mounted on the mounting shaft, which protrudes through a central opening defined by the inner diameter of the disc. A tube or rod is axially aligned with the disc and mounted on the shaft so that a human hand of an average human may grip the rod as it rotates without injury due to friction of the rod. In the preferred embodiment, the solar panel is of sufficient size and efficiency to receive a selected amount of solar energy so that a human hand is not capable of preventing the rod from rotating when the solar panel is exposed to bright sunlight.

In use of the device, the magnitude of solar energy is demonstrated by selecting a solar energy collector and converter and electrically connecting the solar energy collector to the rotating tube assembly and rotating the assembly by exposing the solar energy collector to sunlight. The disc component of the rotating tube assembly is then manually grasped by a first person as a second person attempts to prevent the rotating tube assembly from rotating by gripping the outside surface of the tube component of the assembly with one hand.

In accordance with the invention therefore, there is provided an apparatus for demonstrating collection and conversion of solar energy into mechanical energy, the apparatus comprising:

a solar energy collection device which converts collected solar energy to electrical energy;

a motor electrically connected to the solar energy collecting device, the motor receiving the electrical energy and converting the electrical energy to mechanical energy, the motor having a rotatably driven drive shaft which is rotatably driven by the mechanical energy;

a tube or rod having a longitudinal axis, the tube or rod being fixedly connected at an end thereof to the drive shaft of the motor such that the tube or rod is rotatably driven around its longitudinal axis when the drive shaft is driven;

a mounting platform, the motor and the tube or rod being fixedly connected to the mounting platform, the mounting platform having a pair of handle surfaces spaced a selected straight line distance apart from each other, the motor and the tube or rod being connected to the platform such that the axis of the tube or rod is oriented approximately perpendicular to the straight-line distance between the handle surfaces.

Preferably, the solar energy collection and conversion efficiency is selected to supply the motor with an energy which drivably rotates the tube or rod at a speed and with a power such that an average human being may be able to firmly or tightly grip the rotating tube or rod with the human being's hand when the solar energy collecting device is fully exposed to bright sunlight, so that the human being's hand does not receive injury from the gripping such as from friction of the rotating rod contacting the skin of the hand or otherwise.

The platform preferably comprises a disc having a center axis, the motor and the tube or rod being connected to the disc such that the axis of the tube or rod is substantially coincident with the center axis of the disc. The tube or rod preferably has an outside diameter of between about ½ and about ⅝ inches.

The tube or rod typically has a longitudinal length of at least about 8 inches and the straight line distance between the pair of handle surfaces is at least about 6 inches.

Most preferably, the motor has a selected horsepower, the solar energy collection device has a selected solar energy collection and conversion efficiency and the tube or rod has a selected outside diameter, the horsepower, the efficiency of the solar energy collection device and the outside diameter of the tube or rod being selected such that a human being may not be able to stop the rotation of the tube or rod by gripping an outside surface of the tube or rod with the human being's hand when the solar energy collecting device is fully exposed to bright sunlight.

Preferably, the motor drives the shaft such that the tube or rod rotates at a speed of less than about 10 rpm; the solar energy collecting device preferably has a collection and conversion efficiency of between about 5 and about 15 percent; the solar energy collection device preferably comprises one or more flat panels of photovoltaically sensitive material having a surface collection area of between about 100 and about 400 square inches; and the motor preferably has a maximum horsepower of between about 1/150 and about 1/100 horsepower.

DETAILED DESCRIPTION

Figure 1:
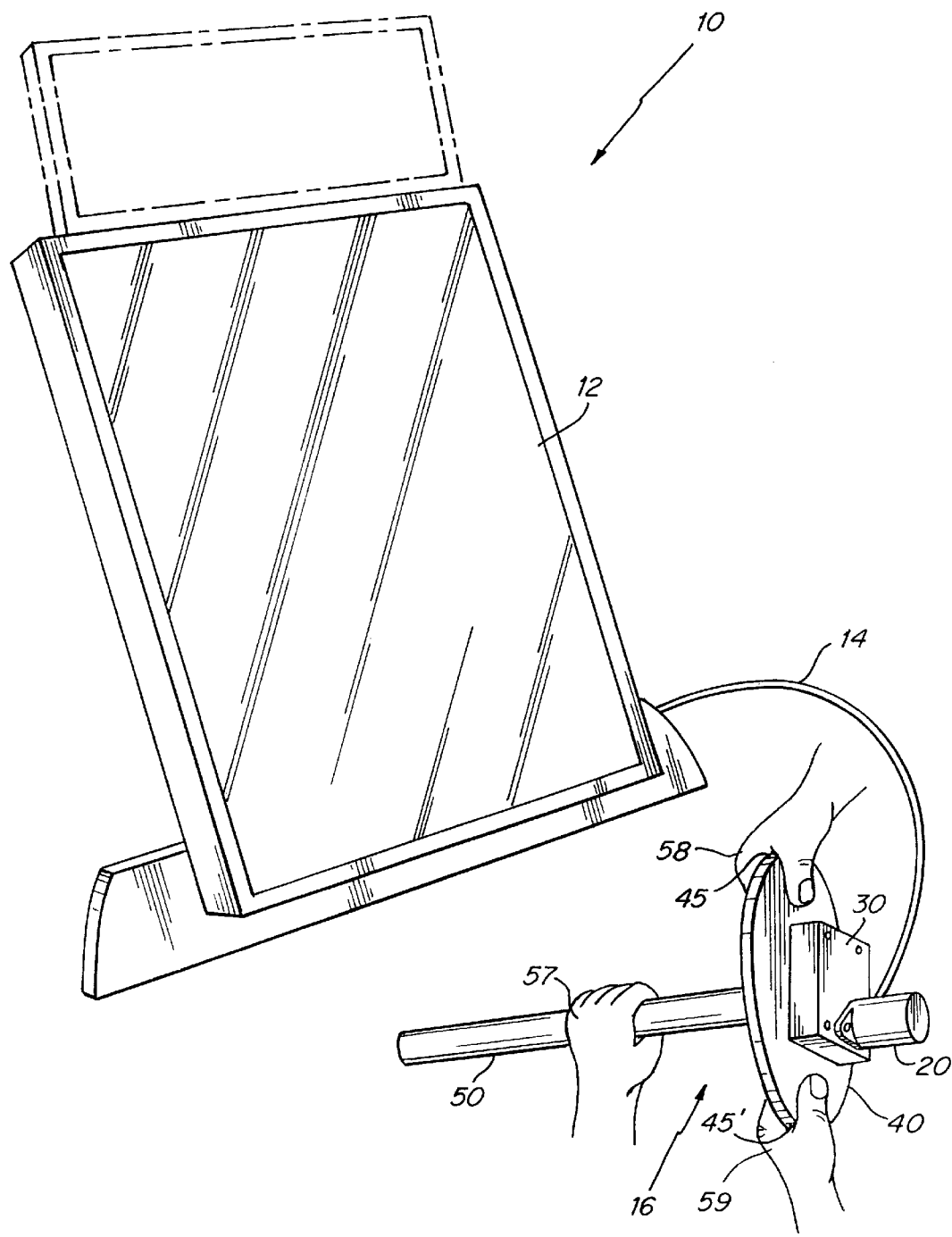
FIG. 1 is a schematic representation of the present invention.

A portable device is provided for a person to manually feel the amount of physical force that is generated when the sun shines on a photovoltaic solar panel. As an educational tool, the invention makes it possible to quickly and dramatically prove to students that solar energy is a tremendous source of power.

In accordance with the invention, the apparatus comprises a solar energy collecting and converting device which is selected to be of a size and have an energy collection and conversion efficiency such that a pre-selected amount of solar energy which is converted to electrical energy is provided to a drive motor having a tube or rod connected thereto such that the tube or rod is rotatably driven around its longitudinal axis. The amount of electrical energy provided to the motor is sufficient to rotatably drive the tube or rod which has a selected outside diameter such that an average human being may manually grip the outside diameter surface of the tube or rod and not be injured due to friction from the rotating rod. In the most preferred embodiment, an average human is not able to prevent the tube or rod from rotating by application of gripping frictional force. The tube or rod component is typically coaxially connected at one end of the tube/rod to the driven axle of the drive shaft of a conventional motor or coaxially connected to a mounting shaft which is driven by the shaft of the motor. The horsepower and gear ratios of the gears of the motor are preselected to rotate the shaft and the tube/rod which is fixedly mounted thereon at a tube/rod rotating speed which, in a most preferred embodiment, prevents a human from being able to stop the rotatably driven tube/rod upon manual gripping of the outside surface of the tube/rod. Most preferably, in order to prevent any substantial possibility of the user's hand being burned or damaged by the frictional gripping force when attempting to stop or slow rotation of the tube/rod component, a momentary on/off switch (e.g. switch 63, FIG. 4) is provided to prevent a user's hand from being burned or damaged. Such a momentary switch mechanism 63 is typically connected to the electrical input to the motor mechanism (e.g. motor 20) and may be manually actuatable by the user(s) of the apparatus or may be automatically actuatable in response to one or more sensors which monitor the speed of rotation of the tube/rod or the voltage or power of the electrical input to the motor such that the motor is stopped upon manual actuation of the switch or is automatically stopped upon sensing of a predetermined maximum in tube/rod rotation or electrical input to the motor. Alternatively, a safety disengage mechanism 69, FIG. 2, which disengages the tube/rod 50 from the shaft 32 may be provided, the disengage mechanism being manually actuatable or automatically actuatable in the same manner as described above with respect to switch mechanism 63.

Most preferably, the solar energy collection and conversion efficiency of the solar collecting device, the horsepower and gear ratios of the motor and the outside diameter of the tube/rod are all preselected so as to work in combination with each other such that the tube/rod may not be stopped or may only at least be slowed from rotating upon firm gripping by a human being. Such parameters are preferably selected for use by an average human being over about five years old, who weighs over about thirty pounds and is healthy enough to manually grasp the outside surface of the tube/rod and apply increasing gripping force thereto without undue strain or stress to the user.

The motor component of the apparatus has a driven shaft and is typically fixedly connected to a portable mounting platform such as a flattened disc such that the axis of the disc is coaxially aligned with the axis of the driven shaft of the motor. A "platform" as used herein is meant to be a plate, disc (having any suitable configuration such as circular, square, triangular or the like) or the equivalent of a plate or disc such as an elongated bar or rod which can be readily grasped with two hands at spaced opposing positions and to which a motor can be manually connected at some mid-point or other central position. In normal use, a first person manually grasps the platform such as a disc with two hands around the outside periphery or circumference of the disc. The motor is electrically connected to the solar energy and converting device such that the axle of the motor and the tube/rod coaxially mounted thereon are rotatably driven. The spaced distance for manual gripping such as the diameter A of the disc 40 is preferably selected to be at least about 6 inches such that the first pecan readily grasp the platform (e.g. at opposite gripping surfaces as shown by the positions of hands 58, 59, FIG. 1 of a first person gripping platform 40) and prevent the platform and its fixedly attached components other than the rod from rotating when a second person manually grips the outside surface of the tube/rod (e.g. as shown in FIG. 1 where the hand 57 of a second person is gripping the outside diameter surface of tube 50) which has a much smaller outside diameter of typically about ½ to about ⅝ inches. Thus, the first person grasping the platform has much greater leverage with which to prevent/resist rotation of the platform than the second person who grasps the tube/rod. As can be readily imagined when the second person grasps the outside surface of the tube/rod, the platform which is fixedly connected to the motor which is, in turn, fixedly attached to the tube/rod, will have a tendency to rotate under the force of the rotating axle of the driven motor.

By selecting the size and solar collection and conversion efficiency of the solar collection device to provide sufficient energy and power to the motor such that a human being may grasp the tube/rod without injury due to friction from gripping the rotating rod, the second person who grasps the tube/rod is provided with education as to the power, advantages, operation and utility of solar energy and solar energy collection/conversion devices.

Referring to FIG. 1, one embodiment of a solar powered rotating tube/rod assembly according to the invention is shown. The apparatus comprises a solar panel or collection of panels 12 electrically connected to a motor 20 of a rotating tube assembly 16 by electric wires 14. The solar energy collecting panel or assembly of panels 12 comprise (s) conventional solar energy collection materials which photovoltaically convert solar energy into electrical energy. Typically the electrical energy generated by the panels 12 is direct current (DC) which is connected to a conventional DC motor 20.

Figure 2:
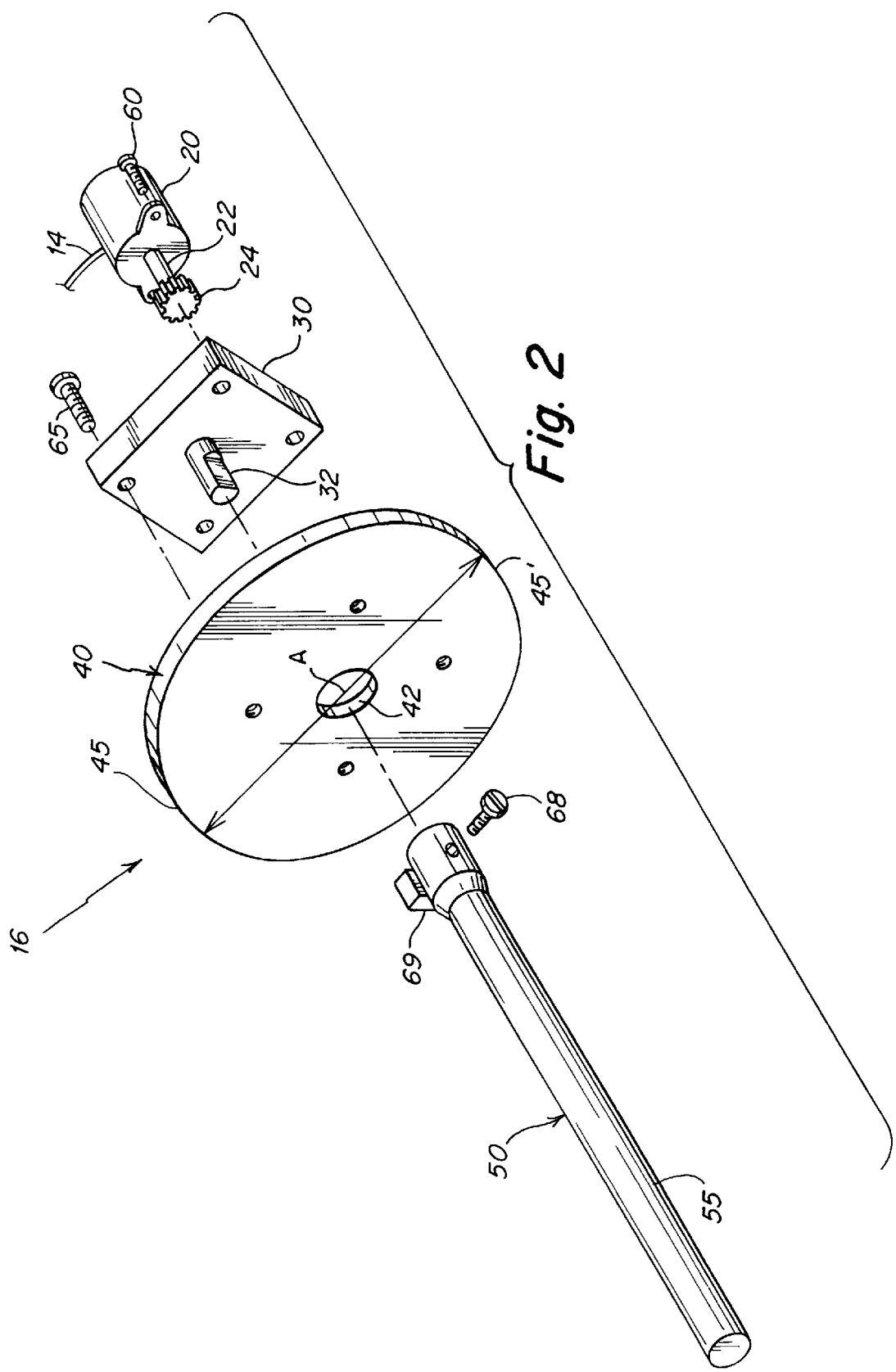
FIG. 2 is an exploded view of the present invention showing the alignment of each element.

As shown in FIG. 2, the rotating tube assembly 16 includes a motor 20, a mounting plate 30, a disc 40, and a rod 50. The motor 20 is electrically connected to the solar panel 12 by electric wires 14. A drive shaft 22 with a drive gear 24 is located on the motor 20 and the drive gear 24 engages a complementary gear (not shown) on the rear end of the shaft 32 rotatably mounted on the mounting plate 30. A portable platform in the form of a hand graspable disc 40 with a central opening 42 is connected to the plate 30 which mounts the driven shaft 32 such that the shaft 32 extends coaxially through the central opening 42. A tube or rod 50 is co-axially connected to the shaft 32 which protrudes through the central opening 42 of the disc 40 for example, by screw 68, although other connection devices may be utilized, as will be known to those of skill in the art. The mounting shaft 32 is likewise coaxially aligned with the axis X of the platform 40.

Figure 3:
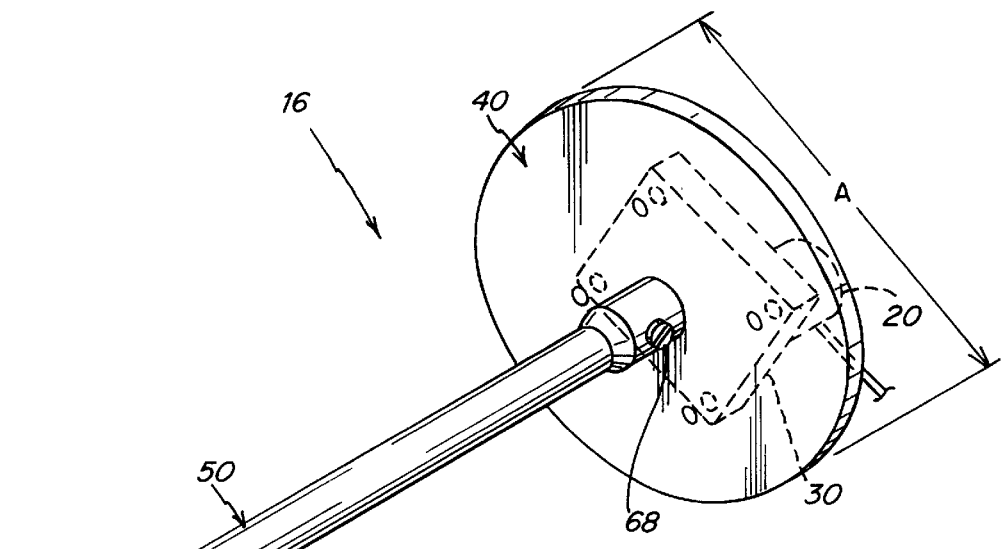
FIG. 3 is a perspective view of the rotating tube assembly.
Figure 4:
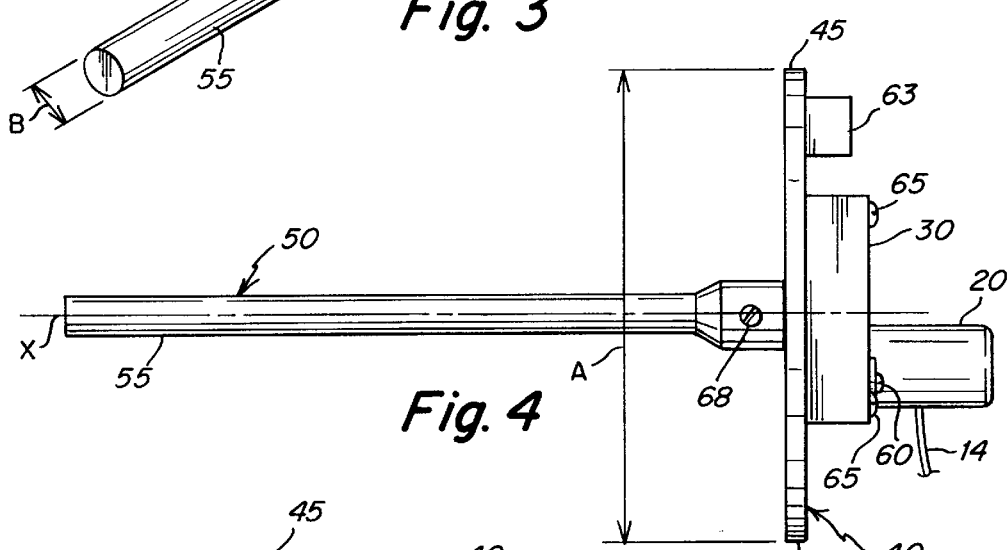
FIG. 4 is a side view of the rod and disc assembly of the present invention.
Figure 5:
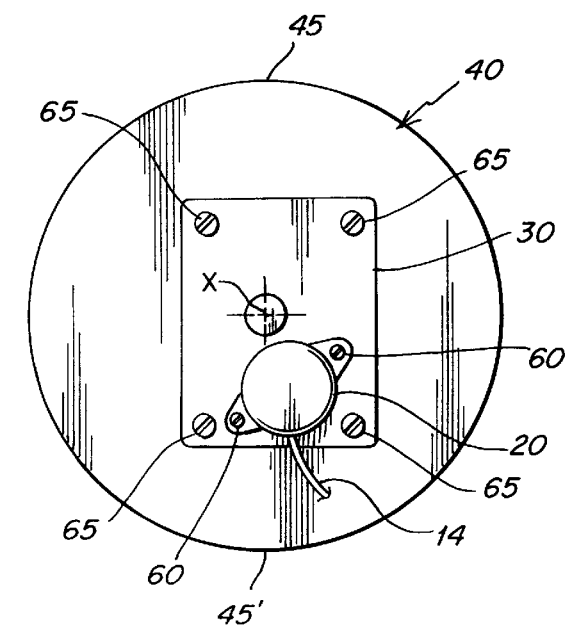
FIG. 5 is a back view of the disc and motor components of the present invention.

FIGS. 3, 4 and 5 show perspective, side and back views of the rotating tube/rod assembly 16 of the present invention 10 when it has been fully assembled. Solar panel(s) 12 of the present invention 10 typically has a 10–12 percent efficiency rate for collection and conversion of sunlight to electrical energy. The photovoltaic solar panel 12 is of selected size to receive an adequate amount of solar energy so that a human hand is capable of grasping the rod 50 while rotating when the solar panel 12 is fully exposed to bright sun light without receiving injury from the friction of the rotating rod 50. A conventional panel or assembly of panels 12 of approximately 16 inches by 16 inches is shown in the embodiment of FIG. 1. The solar panel(s) 12 contains a solar energy collecting and converting material, which when exposed to rays of sunlight automatically converts the energy of the rays to electrical energy. The collecting material includes conventional photoelectrically sensitive material having a mechanism such as diodes which converts solar energy to electrical energy.

The motor 20 and associated gears 24 should be capable of driving the shaft 32 at about 7.0 to 10.5 revolutions per minute, most preferably about 8.75 revolutions per minute and the motor 20 is most preferably a twelve-volt DC motor with $1/125$ of a horsepower. The mounting plate 30 is approximately 2 inches long by 2 inches wide by one inch thick and is made of any suitable material, such as aluminum. As shown, the plate 30 encases the drive shaft 22 and drive gear 24 of the motor 20, which is in turn fastened to the plate 30 by a first set of known fastening means such as screws, eye wing fasteners, nuts and/or bolts 60. The mounting plate 30 is fastened and mounted to the disc 40 by a second set of fastening means 65 which are common in the art such as screws, bolts, pins, etc. The second set of fastening means extend through the mounting plate 30 and into the disc 40. The disc 40 has a central aperture which defines the central opening 42 and an outer diameter A of at least about 6 inches, typically about 6 and ½ inches, with greater sizes possible, if not preferred. The disc 40 typically comprises a plastic material, is approximately ¼ inch thick, and is of sufficient size for an instructor or user to grab spaced surfaces at least about 6 inches apart with both hands. The rod 50 is mounted on the end of the driven shaft 32 which protrudes through central opening 42. The tube or rod 50 typically comprises a plastic material such as a PVC material of approximately 9 to 12 inches long having a most preferred outside diameter B of ⅝ inch with a range of plus or minus 20 percent. The tube/rod 50 can be fastened to the drive shaft 32 by any of the known fastening means in the art, such as screws, bolts, pressure assemblies, etc.

As shown, the axis X along which the longitudinal axis of the tube/rod 50 is mounted and oriented is substantially perpendicular to the straight line distance A between the spaced hand grip surfaces 45, 45', FIG. 4. As shown in FIG. 4, the opposing hand grip surfaces 45 and 45' are located at the maximum diameter A distance apart from each other. However, the user/demonstrator may also conveniently hand grip the disc 40 at two locations around the periphery of the disc 40 other than the maximum opposing diameter distance spacing. Preferably, whatever geometry or form the disc 40 may take (e.g., square, rectangular, hexagonal or the like) the hand-grip positions are spaced at locations such that the line or approximate line between the two grip positions is approximately perpendicular to the mounted and fixed orientation of the longitudinal axis of the tube/rod 50.

In use, when fully exposed sunshine strikes the solar panel(s) 12, it is converted into electrical energy and 12 volts are carried from solar panel 12 to the DC motor 20 by electrical connection 14 which is typically a pair of wires. The electrical motor 20 converts the electric energy into mechanical energy which drives the drive shaft 22 and drive gear 24. A complementary gear (not shown) on the end of the mounting shaft 32 engages the drive gear 24 and in turn rotates, thereby rotating the rod 50 around its longitudinal axis which is fixedly mounted on the mounting shaft 32. The disc 40 is of a comfortable diameter for a first person, such as an instructor, to hold the device on the periphery 45 of the disc 40 and walk around while demonstrating the benefits and force of solar power. A longer set of electric wires or cords may be supplied from the solar panel 12 to the motor 20 in order to give the instructor more maneuverability. When bright sunshine is hitting the solar panel and rotating the rod, the strength of the sun's power can be observed. The instructor may have a second person, such as a student, attempt to grip the rod 50 on its outside surface 55 and try to prevent the rod 50 from turning with the use of his or her hands. With bright light, the rod 50 will be rotating with such force that a human hand is capable of gripping the rod 50 while rotating without receiving injury to the hand from the friction of the rotating rod contacting the skin. The student may be capable of stopping rotation of the tube/rod 50 with less light striking the panel.

If a more complete shadow is cast across the solar panel, the force may instantly cease and the rod stops rotating. Likewise, when such a shadow is removed the force instantly resumes, thereby demonstrating the control that is available with this source of free and clean energy. A person experiencing this demonstration will be given an immediate understanding of the magnitude and potential of solar energy.

The entire assembly 10 is relatively lightweight and portable such that the user/demonstrator may conveniently transport the entire apparatus 10 from location to location with relative ease.

It will now be appreciated to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. Apparatus for demonstrating collection and conversion of solar energy into mechanical energy, the apparatus comprising:

a solar energy collection device which converts collected solar energy to electrical energy;

a motor electrically connected to the solar energy collecting device, the motor receiving the electrical energy and converting the electrical energy to mechanical energy, the motor having a rotatably driven drive shaft which is rotatably driven by the mechanical energy;

a tube or rod constructed and arranged to be gripped by a person's hand and having a longitudinal axis, the tube or rod being fixedly connected at an end thereof to the drive shaft of the motor such that the tube or rod is rotatably driven around its longitudinal axis when the drive shaft is driven;

a portable platform, the motor and the tube or rod being connected to the portable platform, the portable platform having a pair of handle surfaces spaced a selected straight line distance apart from each other, the motor and the tube or rod being connected to the portable platform such that the axis of the tube or rod is oriented approximately perpendicular to the straight-line distance between the handle surfaces;

wherein fully energizing the solar energy collection device causes the tube or rod to rotate with sufficient force such that a person grasping the tube or rod is unable to prevent the rotation thereof.

2. The apparatus of claim 1 wherein the solar energy collection and conversion efficiency is selected to supply the motor with an energy which drivably rotates the tube or rod at a speed and with a power such that an average human being with a hand is capable of gripping the rotating tube or rod with the hand when the solar energy collecting device is fully exposed to bright sunlight without receiving injury to the hand from the gripping.

3. The apparatus of claim 1 wherein the platform comprises a disc having a center axis, the motor and the tube or rod being connected to the disc such that the axis of the tube or rod is substantially coincident with the center axis of the disc.

4. The apparatus of claim 1 wherein the tube or rod has an outside diameter of between about ½ and about ⅝ inches.

5. The apparatus of claim 1 wherein the tube or rod has a longitudinal length of at least about 6 inches.

6. The apparatus of claim 1 wherein the straight line distance between the pair of handle surfaces is at least about 6 inches.

7. The apparatus of claim 1 wherein the motor has a selected horsepower, the solar energy collection device has a selected solar energy collection and conversion efficiency and the tube or rod has a selected outside diameter, the horsepower, the efficiency of the solar energy collection device and the outside diameter of the tube or rod being selected such that a human being is not capable of stopping the rotation of the tube or rod by gripping an outside surface of the tube or rod with the human being's hand when the solar energy collecting device is fully exposed to bright sunlight.

8. The apparatus of claim 1 wherein the motor drives the shaft such that the tube or rod rotates at a speed of less than about 10 rpm.

9. The apparatus of claim 8 wherein the platform comprises a disc having a center axis, the motor and the tube or rod being connected to the disc such that the axis of the tube or rod is substantially coincident with the center axis of the disc.

10. The apparatus of claim 1 wherein the solar energy collecting device has a collection and conversion efficiency of between about 5 and about 15 percent.

11. The apparatus of claim 10 wherein the solar energy collection device comprises one or more flat panels of photovoltaically sensitive material having a surface collection area of between about 100 and about 400 square inches.

12. The apparatus of claim 1 wherein the motor has a maximum horsepower of between about $\frac{1}{150}$ and about $\frac{1}{100}$ horse power.

13. A portable solar energy education device comprising:

a solar panel electrically connected to a motor having a drive shaft and a drive gear, said drive gear engaging a rotatable mounting shaft supported by a portable platform, a disc having an outer diameter, a central opening and an axis, the mounting plate being connected to the disc, the mounting shaft protruding through the central opening of the disc, a tube or rod constructed and arranged to be gripped by a person's hand and mounted on the mounting shaft and axially aligned with the axis of the disc, the solar panel being of sufficient size to receive a selected amount of solar energy so as to cause rotation of the tube or rod with a sufficient force such that a person grasping the tube or rod is unable to prevent rotation of the tube or rod, without injury to the person's hand grasping the tube or rod.

14. Apparatus for demonstrating the conversion of solar energy to mechanical energy, the apparatus comprising:

a solar energy device which collects and converts solar energy to electrical energy;

a motor connected to the solar energy device for receiving electrical energy therefrom, the motor having a rotatable shaft which is rotatably drivable by the received electrical energy, the motor being supported on a portable platform having a pair of hand grip surfaces spaced a selected straight line distance apart from each other;

a tube or rod constructed and arranged to be gripped by a person's hand and having a longitudinal axis, the tube or rod being connected or interconnected at an end thereof to the drive shaft of the motor such that the tube or rod is rotatably drivable around its longitudinal axis;

wherein fully energizing the solar energy collection device causes the tube or rod to rotate with sufficient force such that a person grasping the tube or rod is unable to prevent the rotation thereof.

15. The apparatus of claim 14 wherein the tube or rod has an outside diameter of between about ½ and about ⅝ inches.

16. The apparatus of claim 14 wherein the motor drives the shaft such that the tube or rod rotates at a speed of less than about 10 rpm.

17. The apparatus of claim 14 wherein the motor has a maximum horsepower of between about $\frac{1}{150}$ and about $\frac{1}{100}$ horse power.

* * * * *